No. 787,164. PATENTED APR. 11, 1905.
F. FISHER, Jr.
FRUIT PICKER.
APPLICATION FILED JUNE 29, 1904.
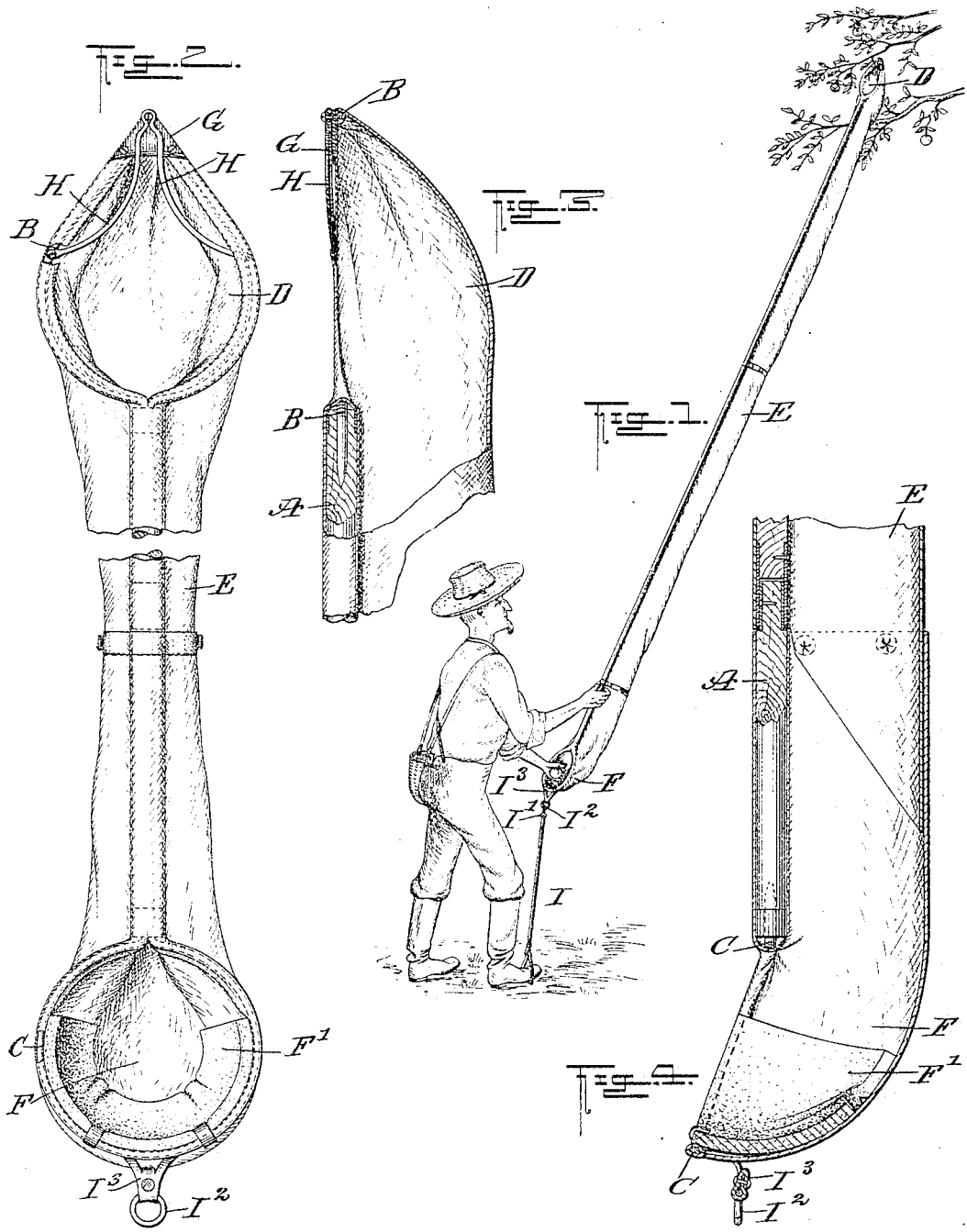
WITNESSES:
INVENTOR
Frank Fisher Jr.
BY
ATTORNEYS No. 787,164.

Patented April 11, 1905.

UNITED STATES PATENT OFFICE.

FRANK FISHER, JR., OF OCONTO, WISCONSIN.

FRUIT-PICKER.

SPECIFICATION forming part of Letters Patent No. 787,164, dated April 11, 1905.

Application filed June 29, 1904. Serial No. 214,613.

*To all whom it may concern:*

Be it known that I, FRANK FISHER, Jr., a citizen of the United States, and a resident of Oconto, in the county of Oconto and State of Wisconsin, have invented a new and Improved Fruit-Picker, of which the following is a full, clear, and exact description.

The object of the invention is to provide a new and improved fruit-picker which is simple and durable in construction, easily manipulated by the operator standing on the ground, and arranged to permit of picking the fruit and delivering it to a pocket within convenient reach of the operator without danger of bruising or otherwise injuring the fruit or tree.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement in use. Fig. 2 is an enlarged plan view of the improvement. Fig. 3 is a sectional side elevation of the upper end of the improvement, and Fig. 4 is a like view of the lower end of the improvement.

On the upper and lower ends of a pole A are secured hoops B and C, of which the upper hoop B is approximately in alinement with the pole A, while the lower hoop C is somewhat extended forwardly and upwardly from the lower end of the said pole A.

On the upper hoop B is secured the mouth of a pocket D, connected by a duct E with a delivery-pocket F, attached at its mouth to the lower hoop C, so that the pockets D and F are connected with each other by the duct E, and hence the fruit dropping into the pocket D can readily pass through the duct E down into the delivery-pocket F to be removed therefrom by the operator, it being understood that the said pockets are practically the terminals of the duct E.

As shown in the drawings, the duct E is removably held on the pole A, and the duct and pockets D and F are preferably made of fleece-lined cloth or other suitable flexible fabric material, and the pole A, as well as the duct, may be made in sections connected with each other by suitable devices, such as ferrules for the pole-sections and buttonholes for the duct-sections.

The picking device for disengaging the fruit from the branch of the tree consists, essentially, of a knife G and a stem-guide H, of which the knife G is in the form of an approximately triangular blade which extends across the outer or apex end of the pear-shaped pocket D and is secured at its sides to the hoop B by screws or other fastening means, the inner side of the blade forming the cutting edge. The guide H is preferably made of a piece of wire bent to an inverted-V shape, the apex portion reaching over the knife-blade and the ends of the side members being secured to opposite sides of the hoop B, one of the screws for securing the knife-blade in position being also used for securing the apex end of the stem-guide in position on top of the knife-blade.

When the operator manipulates the pole and desires to remove the fruit from the limb of the tree, then the fruit is caused to extend into the pocket D with its stem between the side arms or members of the guide H, and by the operator now giving a downward pull the fruit-stem is guided up to the knife-edge of the knife with the fruit underneath the guide and within the pocket D, and a slight jerk now given to the pole by the operator causes the knife to cut the stem, and the fruit now drops into the pocket and slides or rolls down the duct E to finally pass into the delivery-pocket F, from which the fruit is removed by the operator. The delivery-pocket F is provided with an abutment F', of heavy felt or like material, so that on the fruit striking the abutment F' the latter readily yields to prevent bruising or other injury to the fruit. As soon as the fruit has reached the pocket F and has come to a rest therein it can be readily removed by the operator and placed in a basket or other suitable receptacle standing on the ground or carried by the operator.

In order to enable the operator to conveniently manipulate the pole with one hand, a stirrup I is provided, having at the upper end of its band a snap-hook I', adapted to be engaged with a ring I² on a strap I³, secured to the lower hoop C at the delivery-pocket F. The foot-piece of the stirrup is engaged by the foot of the operator, as plainly indicated in Fig. 1, to serve as a fulcrum for the pole in manipulating the latter by one hand to bring the upper end of the picking device into proper relation with the fruit for picking the same, as previously explained.

For first removing the bulk of the fruit on a tree it may be desirable to remove one of the sections of the duct E and pole A and connect the delivery-pocket F with the end of the duct and pole A. This shortening of the picking device enables the operator to conveniently manipulate the device without the use of the stirrup I.

Having thus described my invention, I claim as new and desire to secure by Letters Patent—

1. In a fruit-picker, a pole, an approximately pear-shaped hoop at one end of the pole, a knife-blade secured to the hoop at the apex end thereof, the cutting edge of the knife-blade extending transversely between the sides of the hoop, and an approximately V-shaped guide having its apex end extending over the knife-blade to the apex of the hoop and secured to said apex and its side members extending past the knife-edge and outwardly to the sides of the hoop, with their ends secured to said sides of the hoop.

2. A fruit-picker comprising a pole provided with a picking device at its upper end, and at its lower end with a stirrup flexibly connected therewith.

3. A fruit-picker comprising a pole, hoops at the ends thereof, a duct on the pole and connected with the said hoops, a fruit-detaching device connected with one of the hoops, and a stirrup connected with the other hoop.

4. A fruit-picker comprising a pole, a picking device at the upper end thereof, a stirrup adapted to be engaged and held upon the ground by the foot of the operator, and a strap connecting the lower end of the picker with the stirrup to form a fulcrum to assist the operator in the manipulation of the pole.

5. A fruit-picker, comprising a pole, hoops at the ends thereof, the lower hoop extending downwardly and forwardly from the pole, a duct on the pole and connected with said hoops, a fruit-detaching device connected with the upper hoop, a stirrup adapted to be engaged and held upon the ground by the foot of the operator, and a flexible connection connecting the stirrup with the lower forwardly-extending side of the hoop.

In testimony whereof I have signed my name to this specification in the presence of two subscribing witnesses.

FRANK FISHER, Jr.

Witnesses:
L. C. Harvey,
Bessie Harvey.